United States Patent [19]

Friedman

[11] 4,177,829

[45] Dec. 11, 1979

[54] FLOAT CONTROLLED VALVES

[76] Inventor: David Friedman, 91 Frere Rd., Judith's Paarl, Johannesburg 2001, South Africa

[21] Appl. No.: 787,297

[22] Filed: Apr. 13, 1977

[30] Foreign Application Priority Data

| May 10, 1976 | [ZA] | South Africa | 76/2758 |
| Jun. 7, 1976 | [ZA] | South Africa | 76/3361 |
| Aug. 10, 1976 | [ZA] | South Africa | 76/4784 |
| Nov. 25, 1976 | [ZA] | South Africa | 76/7064 |
| Feb. 23, 1977 | [ZA] | South Africa | 77/1067 |

[51] Int. Cl.² .................................... F16k 31/26
[52] U.S. Cl. ........................... 137/426; 137/443; 137/446; 251/353
[58] Field of Search ............... 137/315, 434, 442, 426, 137/446, 429, 443, 215, 218; 251/353

[56] References Cited

U.S. PATENT DOCUMENTS

| 327,040 | 9/1885 | Vehr et al. | 137/215 |
| 428,199 | 5/1890 | Birkery | 251/353 |
| 645,662 | 3/1900 | Emery | 137/442 |
| 947,106 | 1/1910 | Kirk | 137/443 |
| 1,314,160 | 8/1919 | Stengel | 137/442 |
| 1,547,255 | 7/1925 | Mueller | 137/426 |
| 1,969,645 | 8/1934 | Glenn | 137/446 |
| 2,230,323 | 2/1941 | Guyton | 137/315 |
| 2,367,951 | 1/1945 | Lewis et al. | 137/446 |
| 2,664,913 | 1/1954 | Patten | 137/442 |

FOREIGN PATENT DOCUMENTS

| 255319 | 4/1963 | Australia | 137/442 |
| 1226550 | 3/1971 | United Kingdom | 137/442 |

*Primary Examiner*—Martin P. Schwadron
*Assistant Examiner*—G. L. Walton

[57] ABSTRACT

A float controlled valve including a first body having a passage passing through it, the outlet end of the passage defining a valve seat, a co-operating second body having a closure member, the first body and second body being telescopically movable relative to each other while being in sealing contact to define a chamber including the valve seat and the closure member, and an outlet from said chamber, means being provided for moving the second body with closure member axially relative to the first body with valve seat to cause closing of the valve. A stop valve is built into the passage upstream of the valve seat to isolate the valve seat from supply pressure. The float has a short lever arm and the means for moving the second body comprises a pivotally mounted member supporting eccentrically of the pivot a transverse float arm having one end projecting from the pivotally mounted member and located for engagement with the second body to urge it towards a closed condition as the pivotally mounted member is rotated by a rising float associated with the float arm and means for adjusting axially the degree to which the said end projects from the pivotally mounted member. A loose closure element is free to be moved onto the valve seat when there is a reverse pressure gradient in the water in the valve, to provide a non return function.

3 Claims, 5 Drawing Figures

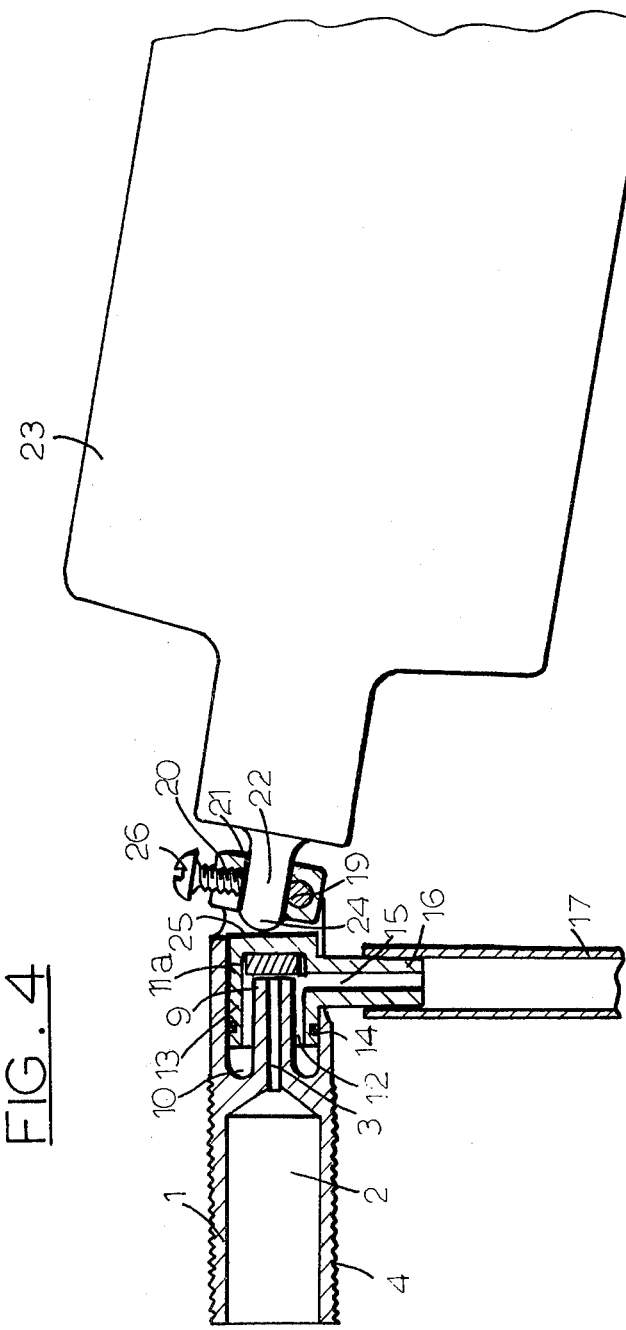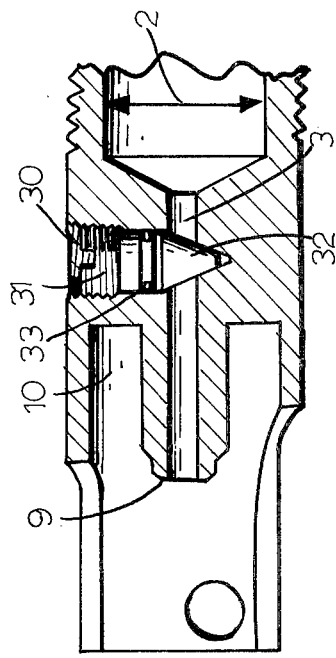

FLOAT CONTROLLED VALVES

BACKGROUND OF THE INVENTION

1. Field of the Invention

This invention relates to float controlled valves of the type widely used to control the level to which cisterns, reservoirs, animal drinking troughs and the like are replenished automatically from a supply of liquid under pressure.

2. Description of the Prior Art

Water pressure variations in the water controlled by the valve cause problems if the variations are extreme and there is a need for a valve which can cope with these and still be economically made.

The inefficient mechanical advantage of the lever in conventional float arm closing mean is such that if the float arm is bent to set the water level at the comparatively lower mains pressures which prevail in the daylight hours due to the water usage being high, it will be found that the level of the liquid will be very much higher during quiet or low consumption periods such as at night or early morning. This is because the float has to be submerged to a greater extent and only this greater displacement can cause the float to seal the float valve at higher pressures.

This cannot be accomplished however, without a considerable rise in the water level which will be far beyond the desired liquid level of the cistern or container resulting in many cases in continual overflowing during these high pressure periods. Conversely, if the float valve is set to a pre-determined level during peak pressure periods it follows that during low pressure or high offtake periods a cistern or container will only fill to a lower level and in a cistern will render efficient flushing impossible. Flushing cisterns operate efficiently at suitable predetermined water levels only.

Water supply authorities also demand a non-return or back syphonage prevention facility in float valves so that pollution of the water supply pipes from a cistern or trough cannot occur.

Float controlled valves which are presently available often have the attendant disadvantage that a separate stop valve must be provided for the supply inlet to the valve. This is necessary so that the float controlled valve can be isolated from the mains supply for servicing it.

SUMMARY OF THE INVENTION

In accordance with this invention there is provided a float controlled valve including a first body having a passage passing through it, the outlet end of the passage defining a valve seat, a co-operating second body having a closure member, the first body and second body being telescopically movable relative to each other whilst being in sealing contact to define a chamber including the valve seat and the closure member, and an outlet from said chamber, means being provided for moving the second body with closure member axially relative to the first body with valve seat to cause closing of the valve, the means for moving the second body comprising a pivotal mounting fixed to the first body and adapted to mount the float.

Preferably the outlet from the chamber is provided in the second body, for preferred connection to a downpipe for silent replenishing of a cistern or trough or the like. It is no disadvantage in practise that is outlet moves during closing and opening of the valve, as it does due to the second body moving for this purpose.

In accordance with a first aspect of this invention, the means for moving the second body comprises a pivotally mounted member supporting eccentrically of the pivot a transverse float arm having one end projecting from the pivotally mounted member and located for engagement with the second body to urge it towards a closed condition as the pivotally mounted member is rotated by a rising float associated with the float arm and means for adjusting axially the degree to which the said end projects from the pivotally mounted member.

Preferred features of the invention provide for the float arm to pass axially through an eccentric hole in the pivotally mounted member with a locking screw engaging the arm transversely, for a pin to pass through a hole in the member to define the pivot, for the hole for the arm and the hole for the pin to be mutually orthogonal and to communicate with each other by partially intersecting, for the arm to have part of its outer periphery engaging with the pin defining the pivot for the pivotally mounted member, to locate such pin axially, and for the pin to be notched for the float arm to engage the notch for more sure location of the pin.

In accordance with a second aspect of this invention there is provided the float controlled valve comprising a body having a passage therethrough, one end of the passage being an inlet and the opposite end defining part of the float controlled valve itself, the body being characterised in that there is a stop valve located therein between the ends of the passage. The stop valve integrally combined in the float controlled valve is thus adapted to permit isolating the float controlled valve for purposes of repair, replacement of parts such as sealing washers and gaskets and other servicing.

This aspect of the invention is also a means of flow control and can be a means of governing the rate of which the water flows through the valve when it is open.

In accordance with a third aspect of this invention the closure member includes a loose or floating closure element which is free to be moved onto the valve seat when there is a reverse pressure gradient in the water. This provides a one-way control of the water flow, preventing back flow.

The invention will be described by way of examples with reference to the accompanying drawings, in which:

BRIEF DESCRIPTION OF THE DRAWING

FIG. 4 illustrates in sectioned elevation a float controlled valve assembly with non-return feature and short float arm, and FIG. 5 illustrates in sectioned elevation a part of a float controlled valve similar to that shown in FIG. 4 with a stop valve included.

DESCRIPTION OF THE PREFERRED EMBODIMENTS

Figure 1:
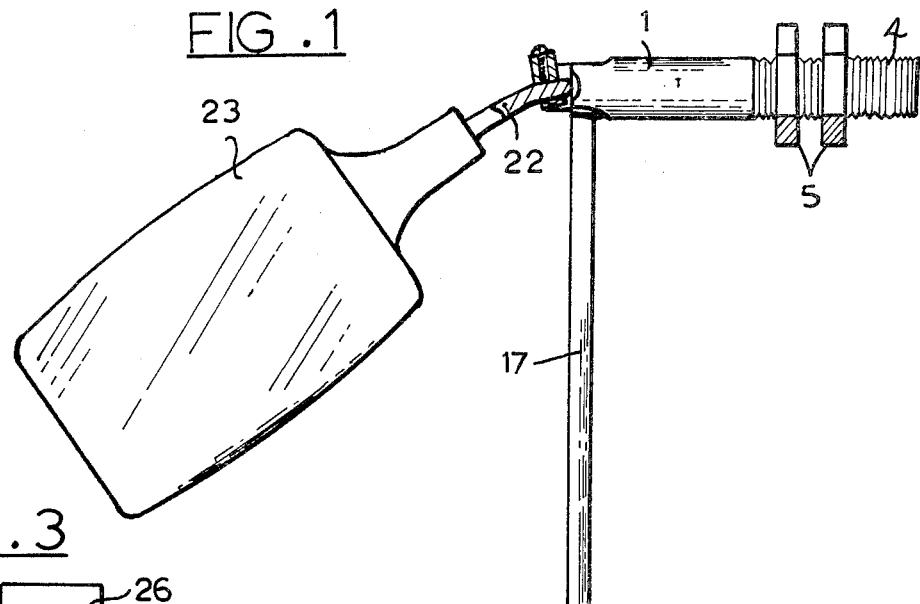
FIG. 1 illustrates in elevation a complete float controlled valve assembly.
Figure 3:
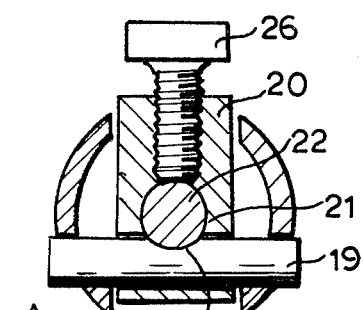
FIG. 3 illustrates a section taken along line A—A in FIG. 2.
Figure 2:
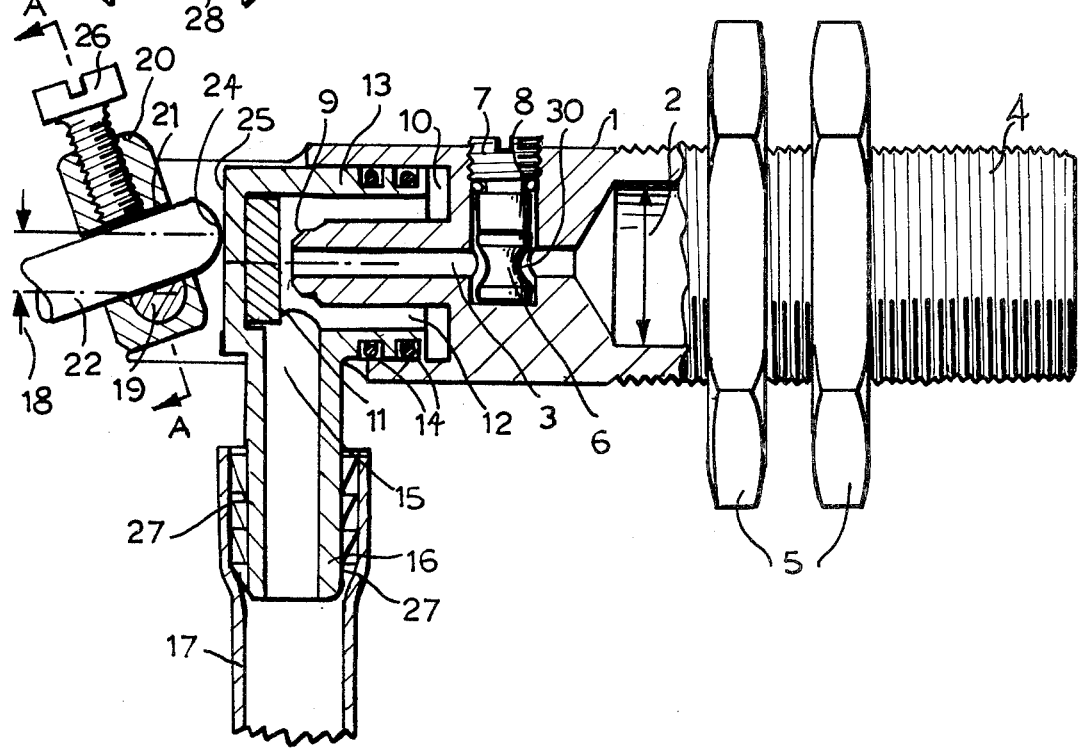
FIG. 2 is a sectional elevation thereof with the float removed.

In the embodiment of the invention illustrated in FIGS. 1 2 and 3 of the drawings a float controlled valve has a first body 1 of basically cylindrical shape with a large bore 2 defining the inlet portion to a passage 3 extending axially through the body. The inlet end of the body is externally screw threaded as indicated by numeral 4 and nuts 5 co-operate with the screw threads to enable the valve body to be secured to a cistern or the like. Threads 4 also enable connection to a water supply.

The portion of the passage 3 remote from the inlet end has a small diameter and an elastomeric "hourglass-shaped" bung 6 engaged by the inner end of a screw threaded member 7 is located in a hole 30 which intersects the passage 3. The bung 6 can be squashed into the passage to close it. In order to achieve this the screw is simply rotated to compress the bung in the passage and deform it so that the necked part of the "hourglass-shape" expands to close off the inlet side. In order to ensure that no leakage occurs via the screw arrangement an O-ring 8 is carried on the outer surface of the screw member and seals on an unthreaded region of hole 30. The outlet of the passage forms a valve seat 9 and the body in this region is provided with a recess 10 of annular cross sectional shape extending into the body coaxially with the passage 3. A closure member 11 of elastomeric material co-operates with the valve seat, the closure member being carried at the inner end of a bore 12 in a second body 13.

The bore 12 is of larger diameter than the inner diameter of the annular recess 10 and the outer diameter of the second body is slightly smaller than the outer diameter of said recess. This enables the second body to slide axially in the recess to cause opening and closing of the valve.

The outer surface of the second body is sealed to the inner surface of the recess by two O-rings 14. This defines a chamber which is sealed apart from the inlet via the passage and an outlet 15 passing through the side wall of the second body to communicate with a tubular-spigot 16 to which a plastics or other downpipe 17 is fitted.

The first body 1 is slotted to accommodate spigot 16 and swivel block 20 and a pivot pin 19 which is offset from the axis of the first body. Pivot pin 19 pivotally mounts swivel block 20 to the first body 1. A hole 21 through the member 20 receives an arm 22 connected to a float 23 at its other end. The projecting end 24 of the arm extends towards and in use engages the rear outer surface 25 of the body 13 such that the closure member is urged towards the valve seat as the float rises. The arm is axially adjustable in position in the hole in the pivotally mounted member 20 and a locking screw 26 is provided to lock the arm in the desired position.

It will be understood that the level at which the valve is closed during use will depend on the extent to which the end 24 of the arm projects out of the pivotally mounted member and the combination of the arm and locking screw provide an easy adjustment of the desired level of liquid in a container. With the above described arrangement a very high mechanical advantage can be obtained about the pivot pin 19 and in fact, it is preferred that the arm extends through a slightly recessed area 28 of the pin, which enhances the leverage advantage and the arm locks the pin axially in position. As a result of this high mechanical advantage only a very short float arm is required as will be apparent from FIG. 1 of the drawings. Also this arrangement of a short float arm has the advantage that the valve will be fully open during a major portion of the time taken for a container to fill and will be closed off rather rapidly towards the end of the filling process. If repairs are necessary to the float controlled valve itself, the screw 7 acting on the bung can simply be screwed tightly into the body and repairs can be carried out as required. This avoids the necessity for a separate stop cock to be installed in the supply line to the float controlled valve thereby saving appreciably on the cost of an installation.

Many local regulations provide that the float controlled valve assemblies should not allow water in a cistern or trough associated with the assembly to be drawn back into the supply lines in the event of the pressure in the supply lines falling below atmospheric pressure. In order to prevent such a siphoning effect, the spigot is provided with two deep grooves 27 in its outer surface which thus communicate between the exterior above the water level and the interior of the downpipe at the top thereof. Should the supply pressure decrease below atmospheric pressure, air will be drawn through these grooves in preference to water being drawn up the downpipe.

An additional means of preventing water being drawn from the cistern into the supply lines is shown in FIG. 4. FIG. 4 shows an embodiment in which the closure member is adapted to stop reverse flow. The elastic disc 11a is made a sliding fit inside the second member 13 bore 12. Thus even if the float 23 is depressed due to a low water level and the second body 13 is in a normally open position the disc 11a can be induced or forced into a closed position on the valve seat 9 if there is a tendency for back flow. This illustration is also interesting in showing a very short lever arm 22 for the float 23. Other features are analogous to certain of those already described with reference to FIGS. 1 to 3 and are indicated accordingly with the same reference numerals. The loose or floating closure element 11a is kept in place without twisting by virtue of the clearance between its circumferential surface and the surface of the bore 12 of the second body 13 being small (though sufficient for free movement) and the clearance between the flat surface of element 11a and the valve seat 9 being small even in the wide open positions of the valve bodies 1 and 13.

The contact of the float arm 22 with the pivot pin 19 in both embodiments allows a very high mechanical advantage to the action provided by the float, and is accordingly a valuable feature, and also this contact also makes possible securing both the float arm 22 and pivot pin 19 with a single screw 26.

This valve is designed particularly to overcome the functional deficiencies of the conventional float controlled valves by the utilization of maximum possible leverage to effect shutting off of the flow of water or fluid through the floatation valve.

The lever or arm for effecting valve closure is dependent on a long arm protruding pivotally from the rear end of the body of the conventional valve. The end of the arm opposite the body is designed to have attached the float member of the valve. The arm length is a minimum of six times the length of the actual valve body and has at most a 24:1 lever advantage over the closing point of the valve. The necessary length of this arm is due to relatively poor employment of lever efficiency in conventional flotation valve design.

The maximum usage of lever efficiency is a major feature of this invention as the design of the invention is such that the pivotal or fulcrum means of the flotation arm is so sited that the distance 18 (see FIG. 1) would provide an advantage of 160:1 if the same length of arm were used as on the conventional flotation valve. It follows that a short float arm of approximately a quarter of the length of the conventional valve arm provides a lever advantage factor on the valve of this embodiment of the invention of 40:1—an increase of 60% in the sealing efficiency of the valve only utilizing a float arm of 25% of the length of a conventional float arm.

An advantage of a flotation valve as described herein is that it enables the manufacture of a compact design of W.C. cisterns.

W.C. cisterns have, in order to accommodate the long arm of the conventional flotation valves, to be large and bulky and only about half of the cubic capacity of the cistern is utilized for water content. A cistern fitted with the valve herein described is dimensionally much more compact and the advantage of reducing the width of the cistern permits the height to be increased which adds to the head of water being brought toward the cistern outlet resulting in greater flushing efficiency that is the case with the conventional cistern where the head of water is small due to a large area in the bottom of the cistern.

A modification of the FIG. 4 embodiment with the loose disc 11a is to place a light compression coil spring behind the disc. This would be adapted to assist the non-return function of this embodiment, providing greater assurance of the function.

In FIG. 5 an alternative stop valve of the needle valve type is shown. Again a hole 30 in the first body 1 intersects the passage 3. A screw 31 with a 45° conical inner end 32 is screwed into the hole 30 and is here shown screwed right down into a corresponding 45° conical inner end of the hole 30. In this position passage 3 is occluded and valve seat 9 is isolated from the water supply, e.g. for repairs or replacements. The screw 31 has a circumferential groove in it below the screw thread for an O-ring 33 which seals an unthreaded part of the walls of the hole 30 to prevent water leakage via the stop valve arrangement.

This stop valve and other kinds of stop valve could be employed alternatively in the embodiment shown in FIGS. 1, 2 and 3.

In order to open passage 3 the needle valve 31 is unscrewed out of hole 30 a short distance.

What I claim is:

1. A float controlled valve including a float, a first body having a passage passing through it, means at the outlet end of the passage defining a valve seat, a cooperating second body having a loose closure element, the first body and second body being telescopically engageable with and movable relative to each other whilst being in sealing contact to define a chamber including the valve seat and the closure member, an outlet from said chamber being provided in the second body, and means for moving the second body and closure element telescopically relative to the first body and valve seat to cause closing of the valve, the means for moving the second body comprising a pivotal mounting fixed to the first body and adapted to mount the float, said closure element being free to move onto the valve seat in the event there is a reverse pressure gradient between said outlet and said passage, the pivotal mounting comprising a pivotally mounted member which is perforated by at least three mutually orthogonally oriented and intersecting holes, a pivot pin disposed in a first one of the holes, a float arm associated with the float and disposed in a second one of the holes and a threaded member disposed in the third one of the holes, the pivot pin having a recessed area with which the float arm is in contact, the threaded member acting to lock the float arm in an axially adjusted position in the second hole and to lock the pivot pin in position in the first hole by reason of contact of the float arm with the pivot pin, the second hole being eccentric with respect to the first hole, the float arm projecting from the pivotally mounted member and located for engagement with the second body to urge it toward a closed condition as the pivotally mounted member is rotated by rising of the float.

2. The float controlled valve set forth in claim 1 wherein said first body includes a collar disposed in surrounding relation to and spaced from the valve seat, said second body having a portion complimentary with said collar, and sealing means disposed therebetween.

3. The valve set forth in claim 2 wherein the second body is generally cup-shaped, said outlet extending from one side thereof, said closure element being freely movable relative to said second body and toward said valve seat under the influence of water pressure in said outlet in excess of that in said passage.

* * * * *

UNITED STATES PATENT AND TRADEMARK OFFICE
CERTIFICATE OF CORRECTION

PATENT NO. : 4,177,829
DATED : December 11, 1979
INVENTOR(S) : David Friedman

It is certified that error appears in the above—identified patent and that said Letters Patent are hereby corrected as shown below:

Column 1, line 68, cancel "is" (second occurrence) and substitute --this--.

Column 5, line 20, cancel "that" and substitute --than--.

Signed and Sealed this

Twentieth Day of May 1980

[SEAL]

Attest:

SIDNEY A. DIAMOND

Attesting Officer

Commissioner of Patents and Trademark